Sept. 24, 1968      H. O. HOADLEY      3,402,650
LIGHT DETECTOR SYSTEM FOR AUTOMATIC EXPOSURE CONTROL
Filed July 14, 1965
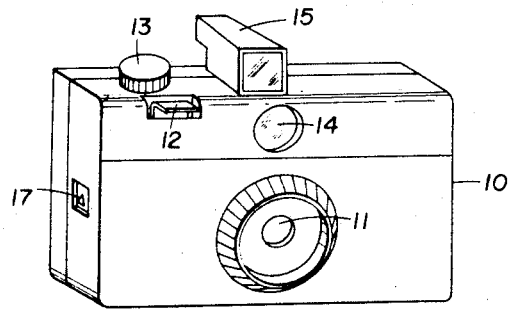
FIG. 1
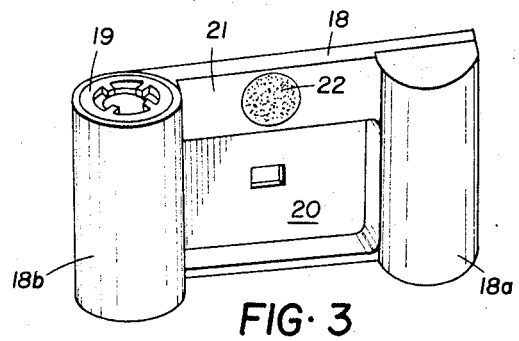
FIG. 3
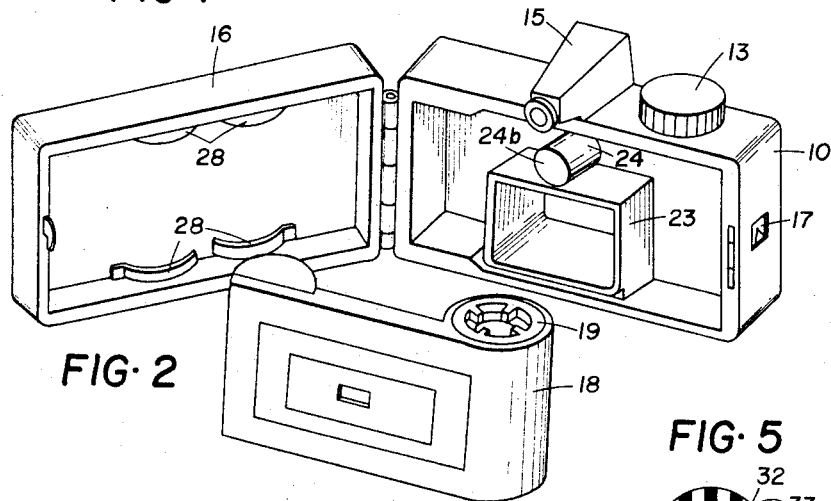
FIG. 2
FIG. 5
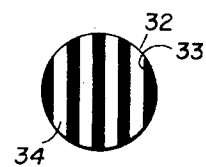
FIG. 6
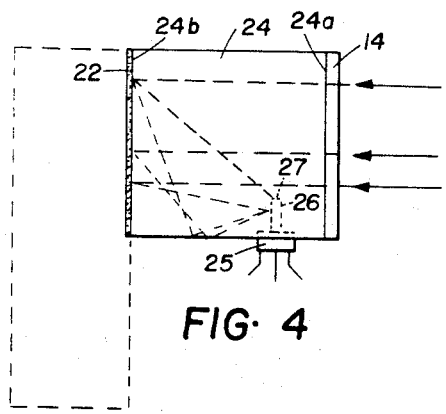
FIG. 4
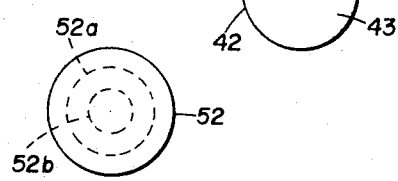
FIG. 7
HARVEY O. HOADLEY
INVENTOR.
BY R. Frank Smith
Thomas R. Lampe
ATTORNEYS United States Patent Office 3,402,650
Patented Sept. 24, 1968

3,402,650
LIGHT DETECTOR SYSTEM FOR AUTOMATIC
EXPOSURE CONTROL
Harvey O. Hoadley, Rochester, N.Y., assignor to Eastman Kodak Company, Rochester, N.Y., a corporation of New Jersey
Filed July 14, 1965, Ser. No. 471,862
15 Claims. (Cl. 95—10)

ABSTRACT OF THE DISCLOSURE

A magazine for a camera with an exposure control system includes a surface for reflecting light from outside the camera onto photo-responsive means on the camera. The reflected light impinging on the photo-responsive means controls operation of the exposure control system.

---

This invention relates to a light detector system for use with automatic exposure control mechanisms of the type commonly found in photographic or cinematographic cameras to condition said mechanisms in accordance with the brightness of the scene being photographed.

Various means have been employed in the past for sensing scene light conditions and adjusting exposure control elements, usually the diaphragm or shutter mechanism, in accordance with the sensed conditions. In cameras of this type, it is also necessary to further adjust such elements to compensate for the speed or sensitivity of the film being used. Such further adjustment may of course be done manually. Manual adjustment, however, introduces the risk of human error and requires considerable diligence and attention on the part of the operator to be certain that the correct film speed value has been set and that the setting has not been inadvertantly changed.

With the advent of magazine-loaded cameras various systems have been devised whereby manual adjustment of the film speed value is no longer necessary. In such systems, indicia such as notches or protrusions of various types are provided on the film magazines or cartridges used in the system which correspond to the sensitivity of the film in the cartridge. Appropriate adjustment of the exposure mechanism is then made through mechanical or electrical linkages to effect proper exposure corresponding to the sensed condition. In such systems close manufacturing tolerances must be maintained with respect to the positioning and dimensional characteristics of such indicia and linkage mechanisms. The maintenance of such critical tolerances becomes increasingly difficult with respect to the linkage structure because of normal wear and tear after repeated use of this type of device.

It is therefor an object of this invention to provide an improved light detector system for use with automatic exposure control systems which is simple, compact and of rugged, virtually wear-proof construction.

It is further object of this invention to provide an improved means for adjusting the overall sensitivity of an exposure control system for the speed of the photographic film loaded in a camera without attention from the operator.

The above objectives have been attained in the present invention by providing a film magazine with a light diffusing surface having a reflective characteristic proportional to the speed of the film in the magazine, said surface reflecting scene light into a photosensitive element of a camera photometric system.

Other objects of the invention will appear from the following description, reference being made to the accompanying drawings wherein:

FIG. 1 is an isometric view of a photographic camera incorporating the elements of the invention disclosed herein;

FIG. 2 is a perspective rear view of the embodiment of the system illustrated in FIG. 1 showing a magazine in position for insertion in the camera;

FIG. 3 is an isometric frontal view of the film magazine shown in FIG. 2;

FIG. 4 is an enlarged side view of a portion of the invention showing in schematic fashion the operational relationship of the various elements;

FIGS. 5, 6 and 7 illustrate alternative forms of reflective surfaces which may be employed on a film holding magazine.

Referring now to FIG. 1, a photographic camera 10 is shown having a simple objective lens 11 and a shutter release lever 12 which actuates the camera shutter mechanism (not shown) through any known linkage means. A winding knob 13 is used by the operator to advance the film (not shown) in the conventional manner. A circular window 14 admits scene light into the camera photometric system in a manner more fully described below. A telescopic-type viewfinder 15 is mounted on top of the camera and is used by the operator to compose the scene for purposes of taking a photograph in the usual manner.

As may be seen with reference to FIG. 2, camera 10 has a hinged cover member 16 which may be released by means of latch member 17 and moved to the position illustrated. When in this position a film magazine 18 may be inserted into the camera. A magazine of this type is more fuly disclosed in U.S. Patent 3,138,081, granted June 23, 1964, to H. Nerwin. As is more fully disclosed in the aforesaid patent and may be seen with reference to FIG. 3, a roll of film (not shown) is disposed in the magazine in a film supply chamber 18a and is selectively positioned with respect to the camera objective lens by being rewound on spool 19 by means of winding knob 13. It is of course understood that spool 19 is disposed for rotatable movement in receiving chamber 18b and that the film as it is being wound onto the spool passes over a flat recessed, rectangular surface 20 which serves to support the film in a flat plane. Magazine 18 differs from that disclosed in the aforementioned patent with the addition of an integral shoulder means 21 having a diffusing surface 22 thereon for the purpose which will be more fully brought out below.

Referring once again to FIG. 2, the main housing of camera 10 is provided with a central box-like member 23, the internal dimensions of which correspond to that of carriage rectangular surface 20. Disposed above box-like member 23 and fixed relative thereto is a transparent cylinder 24 which has one end 24a thereof in contact with window 14 (see FIG. 4) for receiving light therefrom. The other end 24b of the cylinder is flush with the outermost extent of box-like member 23. Embedded in cylinder 24 is a phototransistor 25. Element 26 of phototransistor 25 carries a photosensitive surface 27. Photosensitive surface 27 is shielded from any direct radiation entering the light receiving end 24a of the cylinder and is positioned so that it is impinged only by radiations reflected from the direction of opposite end 24b. In a preferred embodiment of the invention, cylinder 24 is constructed of a transparent acrylic resin into which phototransistor 25 is embedded.

In operation, upon the insertion of the cartridge in the camera and the closing of hinged cover member 16 in a manner which is more fully disclosed in aforementioned U.S. Patent No. 3,138,081, spring elements 28 connected to said cover member bias the magazine toward the front of the camera. The camera housing and magazine are dimensioned so that diffusing surface 22 abuts directly against end 24b of cylinder 24 and rectangular surface 20 is directly in line with the inner chamber of box-like member 23. The precise relation of the diffusing surface 22 to the cylinder end may be seen with reference to FIG. 4 wherein the film magazine is shown in phantom in the position it assumes upon closing of the camera hinged cover member 16.

In the preferred embodiment of the invention diffusing surface 22 is painted on the magazine corresponding in area to that of cylinder end 24b. Light, as represented by the arrows, enters the cylinder 24 through window 14 and is reflected by diffusing surface 22. The light reflected in this manner impinges against photosensitive surface 27 which is so positioned that this reflected light source constitutes the only light energy transmitted to it. It may thus be seen that the total energy received by photosensitive surface 27 is a function of the scene light entering window 14 and the reflectance characteristics of diffusing surface 22. The photosensitive surface 27 is connected in the usual manner to a camera photometric system of any known type.

In order to automatically adjust the overall sensitivity of the aperture control system for the speed of the photographic film loaded in the camera, the reflectivity of the diffusing surface is made directly proportional to the speed of the film in the cartridge. For example, film having the highest speed which is to be used with the camera might have corresponding thereto a white patch of 96% reflectivity. A photographic film having half the speed of the fastest film to be used would have painted on its associated magazine a patch of light gray paint having a 48% reflectivity; a film of one fourth sensitivity, a patch of darker paint of 24% reflectivity, and so on. The reduced reflectivity of a gray reflecting patch means that the photodetector element receives less light from a scene of given brightness, and therefore the exposure control system calls for a larger aperture, which produces the proper exposure on the photographic film of lower speed.

Rather than vary the shade of the patches to be used as diffusing surfaces, reflectance characteristics of the diffusing surfaces may be altered in various additional ways. In FIG. 5, for example, a surface 32 is shown which is a spot having a cross hatch pattern of alternating black stripes 33 and white stripes 34. The reflectance characteristics of this surface would be altered by varying the area of the white stripes by increasing or decreasing their width or number.

FIG. 6 illustrates another system for varying the reflectance characteristics of a diffusing surface. A spot 42 is shown having a half-tone pattern imprinted thereon. As shown in FIG. 6, one half of the spot is a non-reflective, black surface. The other one half is a reflective portion 43. By varying the area of reflective portion 43, light energy would be reflected to a greater or lesser degree.

In FIG. 7 is shown still another method of varying reflectance characteristics of a diffusing surface. Spot 52, which is of a size corresponding to that of the end 24b of transparent cylinder 24, corresponds to the highest film speed with which the camera is to be used. To vary the total energy reaching the photosensitive surface 27 the size of the spot could be reduced as shown by dotted lines 52a and 52b, the area of the spot, of course, being proportional to the speed of the film in the associated magazine. It is of course understood that the remainder of spot 52 would be a black, non-reflecting surface.

A diffusing surface might also be used to adapt a camera photometric system to the spectral sensitivity of the film being employed. This would be done by changing the color of the surface so that it reflects radiation in the spectral region corresponding to that for which the film has been balanced. For example, the device may function to integrate radiations in the infrared and ultra violet portions of the electromagnetic energy spectrum.

To practice the invention it is not necessary that the chamber in which the diffuse reflection takes place be constructed of solid material nor that the diffusing chamber be cylindrical in shape. Also, the diffusing surface need not be limited to the flat vertical form shown but may, for example, be a curved surface having spherical or parabolic characteristics.

Having described the general form of the present invention, it should be understood that the forms illustrated herein have been selected to facilitate the disclosure of the invention rather than to limit the number of forms which it may assume, and various modifications, adaptations and alterations may be applied to the forms shown to meet the requirements of practice without departing from the spirit or scope of the present invention.

I claim:

1. In combination, a camera having an automatic exposure control system, a film magazine within said camera having a surface thereon for reflecting electromagnetic radiation directed thereagainst from outside of said camera, said auotmatic exposure control system including photoresponsive means on said camera positioned for receiving radiation reflected from said surface, the reflectance characteristic of said surface being related directly to and uniquely indicative of the sensitivity of the film in said magazine.

2. In combination, a camera having an automatic exposure control system, a film magazine within said camera having a surface thereon for reflecting electro-magnetic radiation directed thereagainst from outside of said camera, said automatic exposure control system including photoresponsive means on said camera positioned for receiving radiation reflected from said surface, said photoresponsive means comprising a light transmitting solid having a photosensitive element embedded therein, said solid having a first surface thereof exposed to incident light and a second surface thereof in abutting relation with the reflecting surface on said film magazine, said photosensitive element positioned to be impinged primarily by electro-magnetic radiation which has been both transmitted through said first surface and diffusely reflected by the reflecting surface on said magazine.

3. The combination according to claim 2 wherein said light transmitting solid is formed primarily of an acrylic resin.

4. The combination according to claim 2 wherein said light-transmitting solid is a cylinder and said first surface thereof is positioned adjacent a light receiving window in the front of said camera.

5. In combination, a film magazine for reception into a photographic camera and containing film therein of a given sensitivity, a surface on said magazine for reflecting electromagnetic radiation, the reflectance characteristic of said surface being directly related to and uniquely indicative of the sensitivity of the film in said magazine.

6. The combination according to claim 5 wherein said magazine has a first chamber and a second chamber, and wherein said film is movable from said first chamber to said second chamber over a predetermined path, a shoulder element lying substantially adjacent said path and interconnecting said first chamber and said second chamber, said surface being positioned on said shoulder.

7. The combination according to claim 5 wherein said surface comprises a reflective spot having diffuse reflectance characteristics.

8. The combination according to claim 7 wherein said spot is painted on said magazine.

9. In combination, a film magazine for reception into a camera and containing therein film of a given sensitivity to actinic radiation, and radiation control means on said magazine including a surface area on the outside of said magazine having reflectance characteristics with respect to such radiation which are directly related to and uniquely indicative of the sensitivity of said film to such radiation.

10. A film magazine for reception into a camera and adapted to contain therein film of a given sensitivity to actinic radiation, said magazine comprising: a supply chamber; a receiving chamber; a film support between said chambers and adapted to maintain film in a flat plane as it moves from said supply chamber to said receiving chamber; a surface adjacent said support for reflecting electromagnetic radiation, the reflectance characteristic of said surface being directly related to and uniquely indicative of the sensitivity of the film adapted to be used in said magazine.

11. The magazine according to claim 10 wherein a shoulder lies adjacent to and substantially coextensive with said support between said chambers, and wherein said surface is on said shoulder.

12. A film magazine according to claim 10 wherein said surface has a plurality of stripes thereon of varying reflectance values and wherein the reflectance characteristic of said surface is determined by the size and spacing of said stripes.

13. A film magazine according to claim 10 wherein the surface is a spot having a substantially uniform surface and wherein the reflectance characteristic of said spot is determined by the size thereof.

14. In a camera having a chamber for receiving a removable film magazine and having an exposure control system including a photosensitive element, the improvement wherein said exposure control system comprises means forming a light-transmitting passage leading from the exterior of said camera to the interior of said chamber, and wherein said photosensitive element is located within said camera in position to be impinged upon by light which has been transmitted to said chamber by said passage-forming means and reflected from a film magazine within said chamber.

15. The camera according to claim 14 wherein said element is located within said passage with its light-sensitive portion directed toward said chamber.

References Cited
UNITED STATES PATENTS

| | | | |
|---|---|---|---|
| 2,080,055 | 5/1937 | Martin | 95—31 |
| 2,568,734 | 9/1951 | Heyer | 352—123 |
| 3,116,670 | 1/1964 | Ball. | |
| 3,248,166 | 4/1966 | Reinsch. | |

NORTON ANSHER, *Primary Examiner.*

J. F. PETERS, *Assistant Examiner.*